(12) United States Patent
Vereckey et al.

(10) Patent No.: US 10,711,212 B2
(45) Date of Patent: Jul. 14, 2020

(54) PROCEDURE AND EQUIPMENT FOR THE PRODUCTION OF SOLID FUEL FROM WASTEWATER SLUDGE

(76) Inventors: Istvan Vereckey, Gyor (HU); ifj. Istvan Vereckey, Gyor (HU); Bela Bognar, Gyorzamoly (HU); Laszlo Ercsey, Budapest (HU)

(*) Notice: Subject to any disclaimer, the term of this patent is extended or adjusted under 35 U.S.C. 154(b) by 900 days.

(21) Appl. No.: 14/236,653

(22) PCT Filed: Jul. 31, 2012

(86) PCT No.: PCT/HU2012/000067
§ 371 (c)(1),
(2), (4) Date: Aug. 14, 2014

(87) PCT Pub. No.: WO2013/024309
PCT Pub. Date: Feb. 21, 2013

(65) Prior Publication Data
US 2014/0360093 A1 Dec. 11, 2014

(30) Foreign Application Priority Data

Aug. 1, 2011 (HU) .................................. 1100410

(51) Int. Cl.
| | |
|---|---|
| *C10L 5/08* | (2006.01) |
| *C10L 5/28* | (2006.01) |
| *C10L 5/48* | (2006.01) |
| *C02F 11/121* | (2019.01) |
| *C10L 5/36* | (2006.01) |
| *C10L 5/46* | (2006.01) |
| *C02F 11/18* | (2006.01) |

(Continued)

(52) U.S. Cl.
CPC ............... *C10L 5/48* (2013.01); *C02F 11/121* (2013.01); *C02F 11/18* (2013.01); *C10L 5/08* (2013.01); *C10L 5/28* (2013.01); *C10L 5/363* (2013.01); *C10L 5/46* (2013.01); *C02F 11/122* (2013.01); *C02F 11/127* (2013.01); *Y02E 50/10* (2013.01); *Y02E 50/30* (2013.01)

(58) Field of Classification Search
CPC ..... C02F 11/121; C02F 11/122; C02F 11/127; C02F 11/18; C10L 5/08; C10L 5/28; C10L 5/363; C10L 5/46; C10L 5/48; Y02E 50/10; Y02E 50/30
See application file for complete search history.

(56) References Cited

U.S. PATENT DOCUMENTS 3,529,558 A * 9/1970 Tanner .................... C02F 11/18
110/224
4,768,292 A 9/1988 Manzei
(Continued)

FOREIGN PATENT DOCUMENTS

DE 3429055 A1 2/1986
DE 3933576 C1 * 2/1991 .............. C02F 11/10
(Continued)

OTHER PUBLICATIONS

International Search Report from PCT/HU2012/000067 dated Mar. 5, 2013.

*Primary Examiner* — Latosha Hines
(74) *Attorney, Agent, or Firm* — Millen, White, Zelano & Branigan, PC; Ryan Pool

(57) ABSTRACT

Process for the production of solid fuel from wastewater sludge, and equipment suitable for carrying out the production thereof.

15 Claims, 2 Drawing Sheets

(51) Int. Cl.
  *C02F 11/122* (2019.01)
  *C02F 11/127* (2019.01)

(56) References Cited

U.S. PATENT DOCUMENTS

| | | | | | |
|---|---|---|---|---|---|
| 4,852,269 | A | * | 8/1989 | Glorioso | C02F 11/12 34/376 |
| 5,215,670 | A | * | 6/1993 | Girovich | F26B 1/00 209/659 |
| 6,161,305 | A | * | 12/2000 | Maier | C02F 11/12 34/221 |
| 6,638,452 | B2 | | 10/2003 | Schnabel | |
| 2002/0070183 | A1 | | 6/2002 | Schnabel | |

FOREIGN PATENT DOCUMENTS

| | | | | | |
|---|---|---|---|---|---|
| DE | 19851612 | A1 | | 5/2000 | |
| DE | 1209127 | A1 | * | 5/2002 | C02F 11/127 |
| EP | 1209127 | A1 | * | 5/2002 | C02F 11/127 |
| EP | 1209127 | A1 | | 5/2002 | |

\* cited by examiner

PROCEDURE AND EQUIPMENT FOR THE PRODUCTION OF SOLID FUEL FROM WASTEWATER SLUDGE

The subject of the invention relates to a procedure and equipment for the production of solid fuel from wastewater sludge with which solution favourably pellets or briquettes that can be usefully used as fuel are created from material that contaminates the environment.

Due to the significant rise in energy prices and in the interest of increasing the renewable energy production quota undertaken by the countries of the European Union it can be clearly stated that where there is the economic possibility secondary energy production is carried out (heat and electricity energy production) from the organic material in wastewater sludge. When using wastewater sludge for energy production not only is the energy content of the sludge utilised, but also the waste is also neutralised. There is an increasing demand appearing for equipment suitable for using secondary, renewable energy sources either independently or in combination with traditional types of energy that complies with both economic and environmental protection requirements.

All developed countries have elaborated a well-considered strategy based on wide-ranging professional agreement for the utilisation of communal wastewater sludge to replace fossil fuels. There are countries (e.g. Denmark and Switzerland) where cement industry utilisation is dominant while in other countries (e.g. Germany) wastewater sludge is primarily used in power plants.

An important element of the European Union's energy policy is to increase energy independence and to use renewable energy sources in the interest—of protecting the natural environment. One of the most important issues regarding further development is how to utilise the available renewable energy sources with greater efficiency in the interest of improving economic competitiveness. Act XLIII of 2000 on waste management states various prescriptions in the interest of protecting the environment, human health and ensuring sustainable development Following the primary objectives of prevention and minimisation the aforementioned legislation and the National Waste Management Plan (2000) both prescribe the use of wastes created in certain technologies in other technologies. This latter statement is primarily understood as meaning use primarily as material and secondly as an alternative fuel in the form of energy recovery. The European Union prescribes the drainage and treatment of communal wastewaters as a compulsory task for settlements with a population over 2000 for the Member States and the National Wastewater Drainage and Treatment Realisation programme was drawn up so that we can comply with this obligation. However, Hungary would have to triple its number of wastewater treatment plants in a short period of time which would involve a two-and-a-halftimes increase of treatment capacity. As a result the amount of wastewater sludge will also increase many times. With the development of the wastewater network the amount of wastewater sludge created in the wastewater treatment plants will increase at a fast pace.

At present—according to estimates—the amount of wastewater sludge created in Hungary is 160-170,000 tonnes of dry material, and this amount may even double by 2015. Counting with a dry material content of 18-25% the annually created wastewater sludge amount approaches 1 million tonnes. Today this is one of the most significant environmental problems in Hungary that still needs to be solved. Among the possible treatment methods depositing is used in a large proportion as a neutralisation solution. It is essential to reduce this amount, as since 1 Jun. 2005 it has been forbidden to deposit wastewater sludge without treatment according to Ministry of Environment decree no 22/2001. (X.IO.) KoM. Use in agriculture is also prominent, but the tightening regulations may reduce this amount to a large extent. A solution to this problem may be utilisation as (alternative) fuel to replace fossil fuels both on the Hungarian and international level.

Therefore, the increasingly larger amount of wastewater sludge represents a serious problem in wastewater treatment plants, its environmentally friendly use has not been solved. Besides terminating the environmental harm caused by wastewater sludge the primary aim set for the invention is to transform wastewater sludge into a useful material the further utilisation of which is environmentally friendly and clearly advantageous for society. A further objective of the invention is to create a solution through which not only is the problem of individual wastewater treatment plants solved but that also ensures a general solution.

As a result of our studies the aim of the invention may be most favourably achieved by producing pellets from the wastewater sludge. Pellets are small, with a diameter of a few centimetres at the most, cylindrical-high energy content, products which are pressed using a suitable technology process from appropriately prepared raw material (traditionally wood waste) and which are an excellent natural source of energy and so an economic fuel. The advantages of utilisation as pellets are obvious as an environmentally friendly product is produced from environmentally damaging wastewater sludge, which also has a low hazardous material content and has a high heat content so it can be directly used as fuel, even in the same combustion equipment that is used to produce the pellet. A further advantage of it is that while using it as a fuel the combustion equipment simply atomises it. Naturally, fuel larger than pellets can also be produced, this process creates briquettes. In the present specification we produce solid fuel from wastewater sludge, which procedure is frequently called pelletizing, irrespective of the size of the solid fuel produced the solid fuel is called pellet.

The dry material content of wastewater sludge is 2-8%, in other words it contains a lot of water and there are various known methods for its even merely partial removal. In terms of energy there are two distinct dehydration principles:
(water) removal from the material without changing its phase,
water removal by changing its phase (from the liquid to the gas phase).

The first principle can be realised using mechanical methods (pressing, centrifuging, suction, filtering) or by bringing the wet material into direct content with materials the water transfer feature of which is much lower. The second principle is related to the heat required for the phase transformation to water vapour. The water binding energy influences the various dehydration principles and drying methods used. If the state of the water is not changed only that water may be removed that is weakly bound to the material.

It is known that it is favourable to perform mechanical dehydration before drying, as the specific drying cost of this is only $1/40$th of the total. With dehydration the water loosely bound by adhesive forces can be completely removed but the capillary water content can only be partly removed.

Known methods of mechanical dehydration:
Pressing (squeezing) between rollers, when a part of the water is "squeezed" out of the material when it passes between rollers with flexible, hard rubber surfaces clamped together by a load depending on the structure of the material.

During centrifuging the water pushing effect of the force performs the mechanical water removal.

During suction (vacuum suction) the effect of a vacuum is realised, the pressure of the flowing air pushes a part of the water from the material passing over the "sucked" gap. The dehydration method is determined partially by the degree of preparation of the material to be dried and partially by the mechanical sensitivity of the material (e.g. fragile material cannot be centrifuged, etc.).

Among the listed types of water content the various mechanical dehydration processes completely remove the absorption water content and only partly the capillary water content. The remaining capillary water content has to be "expelled" from the material using an accelerated evaporation, drying process.

A drying technology also exists in the chemical industry. Drying is a complex process, which is preceded by an experimental procedure to determine the composition of the material and how it behaves during drying. We have performed numerous experiments on wastewater sludge, as a result of which we succeeded in finding the solution according to the invention.

Under industrial conditions various procedures and types of equipment are used to burn waste and/or fuels that are difficult to burn. The main aim of these solutions is usually to extract the heat energy created. Such a device is presented, for example, by Hungarian patent specification number P9602475. In the case of the solution in the specification, the after-burning of the gases containing oxygen deriving from the combustion is performed in a circulated fluid bed, only with the oxygen present in the gases.

In the case of the known solutions the air used for the burning is usually pumped in from the external environment, as it can be seen in specification number JP63290316. Air pre-heating is used in industrial boilers, but the pre-heated air is obtained from the post-heating surfaces of the boiler making use of the heat of the relatively lower temperature flue gas. Such a procedure and equipment is presented, for example, by Hungarian patent specification number P0300545. In the case of this solution the flow of oxygen and the temperature is regulated, the latter is performed in such a way that a regulated amount of re circulated flue gas is mixed with the incoming fresh air. As within the entire boiler the metal air pre-heating parts are at the lowest temperature, the temperature of the air pre-heated in this way does not exceed 420° C. (See: Luzsa-M6ricz-P6tsa: the structure of steam boilers, university notes, p. 49, table 10.) As a consequence chemical reaction do not perfectly take place, therefore, in many cases in order to maintain combustion support burners also have to be operated, which significantly increases operation costs, decreasing efficiency.

A further problem is achieving favourable flue gas emission values, which can only be solved by separately inputting other compounds or with an expensive separator built into the flue gas flow.

Our experiments performed with wastewater sludge have proved that it is practical to perform the drying of wastewater sludge in several steps, where it is advantageous to use first mechanical drying mixed with drying—pre- and final drying—based on a phase-change technique. We have also recognised that special burning equipment is needed to realise the drying according to the invention that, on the one hand, uses the steam created and gases released during the pre-drying of the wastewater sludge, and, on the other hand, that permanently maintains a higher-than-usual temperature in the combustion chamber, and, furthermore, that uses the higher amount of flue gas heat of the burning equipment during final drying. We have also realised that apart from what we have already mentioned it is possible to permanently maintain a higher-than-usual temperature in the combustion chamber if the input temperature of the air feeding combustion in the burning equipment operated by us is maintained at around the temperature of the combustion chamber of the burning equipment.

The subject of the invention relates to the production of solid fuel from wastewater sludge, during which the wastewater sludge containing 2-8% dry material is first subjected to mechanical water removal, during which the absorption water is removed and we produce wastewater sludge with a dry material content of at least 25-30%. The significant proportion of the remaining capillary water, favourably at least half of it, is removed by an accelerated evaporation process, drying.

The essence of the procedure is that we pre-dry the wastewater sludge containing at least 25-30% dry material using the heat of the flue gas of the burning equipment operated by us to a dry material content of 50-55%, we extract the steam created and gases released during pre-drying, filtering them if necessary and utilise them by returning them to the burning equipment. We pelletize the wastewater sludge containing 50-55% dry material at a high pressure of, favourably, 800-900 bar, then we perform final drying of the pellet product created in this way to a dry material content of at least 80-85% by making further use of the heat of the flue gas of the burning equipment operated by us. We use a part of the solid pellet final product, favourably at least 30-50% of it as fuel in the burning equipment operated by us.

In the case of a practical implementation of the procedure in the burning equipment operated by us we maintain the input temperature of the air feeding the burning at around the temperature of the combustion chamber of the burning equipment.

In the case of an advantageous realisation of the procedure we also use the heat of the flue gas of the burning equipment for producing energy.

In the case of a further implementation of the procedure a further part of the solid pellet final product, advantageously 70.50%, is cooled, then packaged in the interest of practical utilisation at further locations.

The subject of the invention also relates to equipment for the production of solid fuel from wastewater sludge, which is connected to a mechanical dehydration unit for the feeding of the wastewater sludge. The output of this is connected to a final dryer through a pre-dryer and pelletizer extruder; furthermore it contains burning equipment connected to the pre-dryer and final dryer. The equipment is set up in such a way that the pre-dryer is a double-walled drum, and there is a spiral-shaped mixing blade fixed inside this drum.

The final dryer is fitted with stainless steel bands, and the flue gas output of the burning equipment runs between the steel bands via a heat exchanger. The forced-flow air extraction of the final dryer is connected to the input between the two walls of the double-walled drum of the pre-dryer. The suction connector of the drum is connected with the combustion chamber of the burning equipment, favourably through a filter; furthermore, the output of the final dryer at the end of the steel bands is connected to the burning equipment through the fuel feeder.

In the case of an advantageous embodiment of the equipment the outside wall of the burning equipment is fitted with heat insulation and a space(s) that raises the temperature of the gases feeding combustion is(are) formed in the wall and which is(are) connected to the combustion chamber.

In the case of a further advantageous embodiment of the equipment it has a cooler unit connected to the final dryer 5 and also includes a packaging unit.

In the case of a practical construction form of the equipment according to the invention the equipment is placed in a container(s). This solution is especially practical as with this mobile form of the equipment wastewater treatment plants that are distant from one another can be visited one after the other. It is practical to visit the individual wastewater treatment plants with our mobile equipment according to an appropriate plan, in a given chronological order and when there is a sufficient amount of wastewater sludge available for processing.

We present a possible, example solution of the equipment according to the invention in detail on the basis of the appended drawings, without limiting our sphere of protection to this concrete example, where

Figure 1:
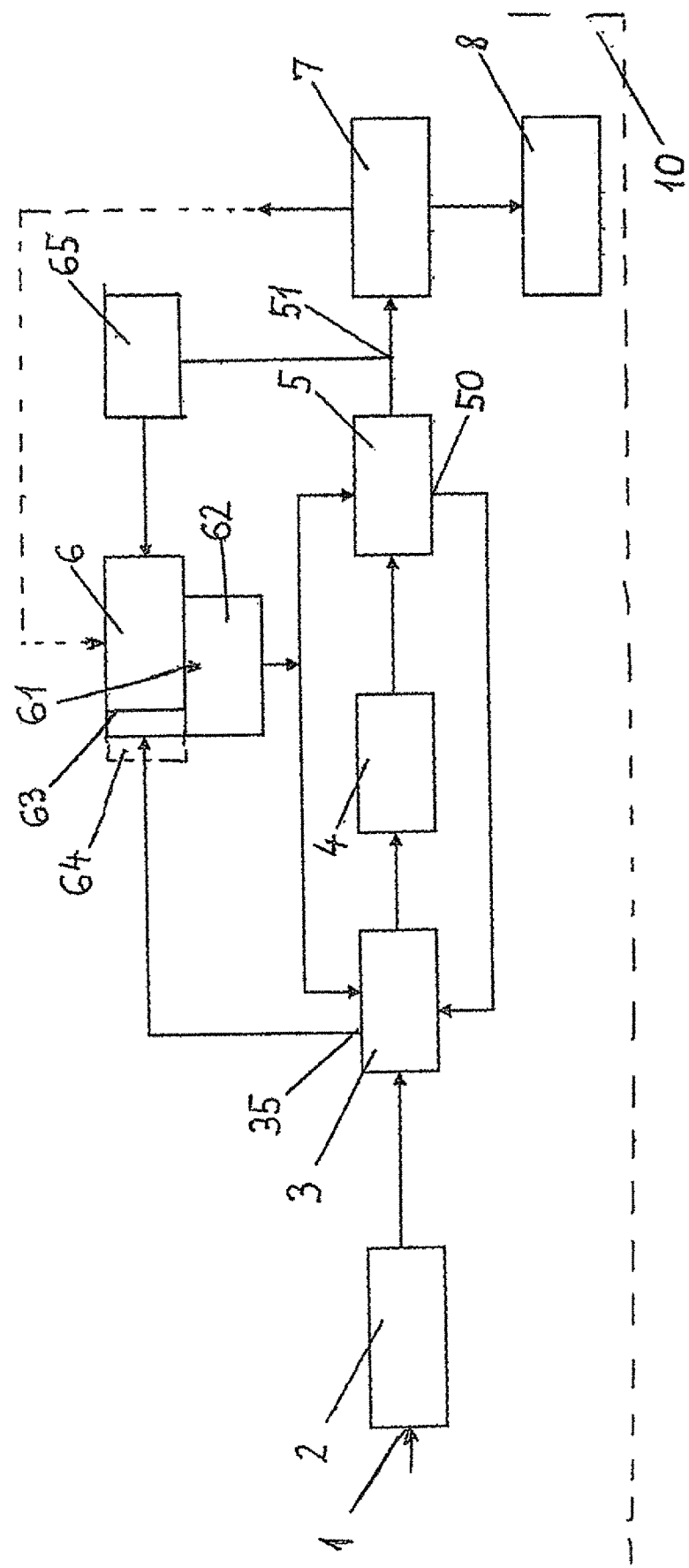
FIG. 1 shows a block outline of an advantageous construction of the equipment.

The equipment shown in FIG. 1 is for the production of solid fuel from wastewater sludge, which is connected to a mechanical dehydration unit 2 for the input of wastewater sludge 1. The output of this is connected to a final dryer 5 via a pre-dryer 3 and pelletizer extruder 4. Furthermore, it contains burning equipment 6 connected to the pre-dryer 3 and the final dryer 5. The equipment is set up in such a way that the pre-dryer 3 is a double-walled drum 30—see FIG. 2—and there is a spiral mixing blade 31 fixed inside this drum 30. The final dryer 5 is fitted with stainless steel bands, and the flue gas 61 output 62 of the burning equipment 6 runs between the steel bands via a heat exchanger. It has a cooler unit 7 connected to the final dryer 5 and also includes a packaging unit 8. In a very practical way the equipment according to the invention is placed in container(s) 10.

Figure 2:
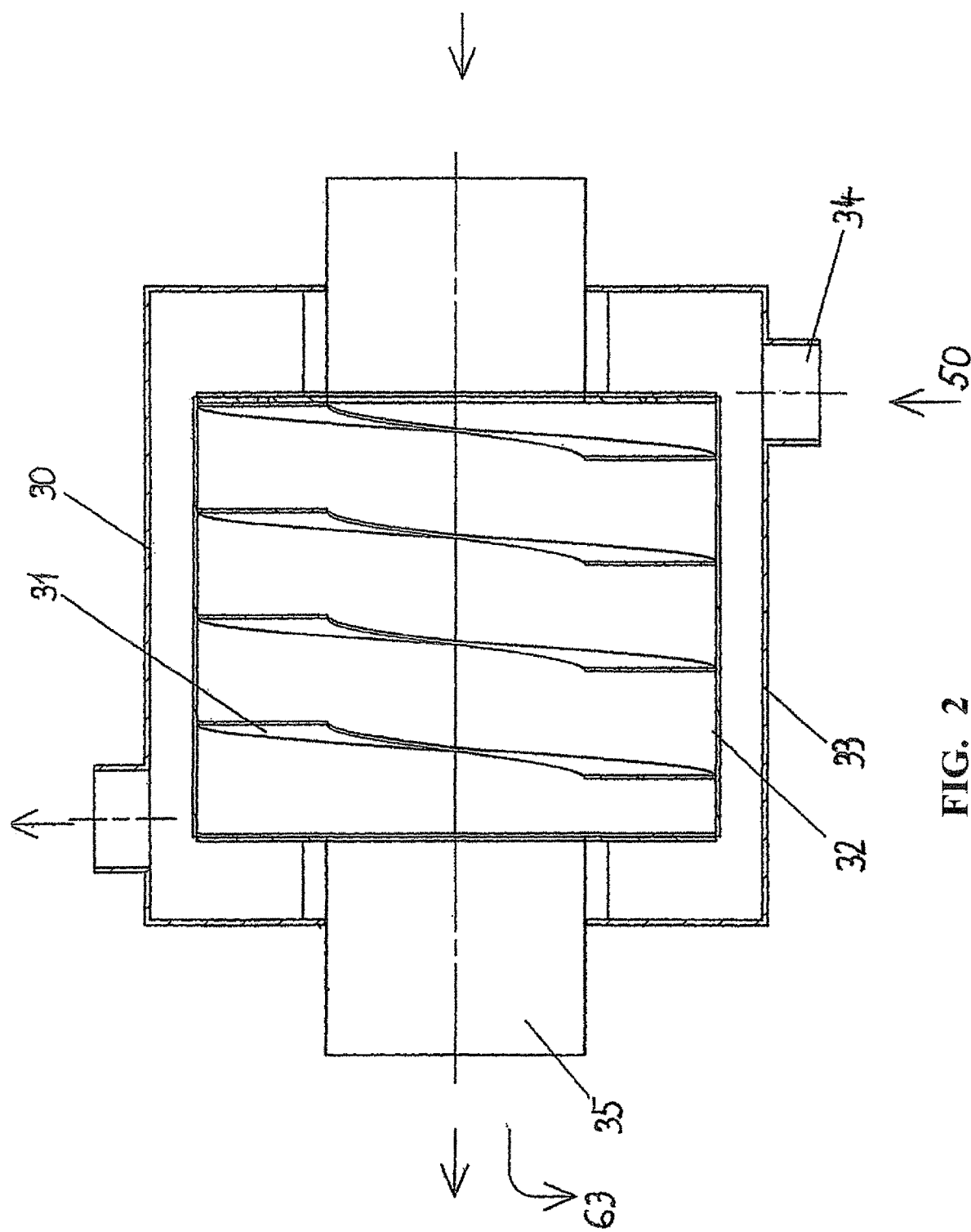
FIG. 2 shows an outline drawing of a practical solution of the pre-dryer.

FIG. 2 illustrates a practical solution of the pre-dryer 3, where the forced-flow air extraction 50 of the final dryer 5 is connected to the input 34 between the two walls 32, 33 of the double-walled drum 30 of the pre-dryer 3. The suction connector 35 of the drum 30 is connected with the combustion chamber 63 of the burning equipment 3, favourably through a filter 64. Furthermore, the output 51 of the final dryer 5 at the end of the steel bands is connected to the burning equipment 6 through the fuel feeder 65.

Favourably, the outside wall of the burning equipment 6 is fitted with heat insulation and a space(s) that raises the temperature of the gases feeding combustion is(are) formed in the wall and which is(are) connected to the combustion chamber 63 of the burning equipment 6.

The equipment according to the invention operates in detail according to the following.

The dehydration of the wastewater sludge containing 2-8% dry material is broken down to two main steps, a mechanical and a thermal step. A mechanical dehydration unit 2 is connected for the inputting of the wastewater sludge 1, during which the absorption water is removed and we produce wastewater sludge with a dry material content of at least 25-30%. The mechanical dehydration unit 2 is known in itself and favourably uses a vacuum or belt press technique. The significant proportion of the remaining capillary water, favourably at least half of it, is removed from the wastewater sludge by an accelerated evaporation process, drying. We pre-dry the wastewater sludge containing at least 25-30% dry material using the heat of the flue gas of the burning equipment 6 operated by us to a dry material content of 50-55% in the pre-dryer 3. We extract the steam created and gases released during pre-drying via the suction connector 35 of the drum 3, filtering them if necessary with the filter 64 and utilise them by returning them to the burning equipment 6. We pelletize the wastewater sludge containing 50-55% dry material at a high pressure of, favourably, 800-900 bar in the extruder 4, then we perform final drying in the final dryer 5 of the pellet product created in this way to a dry material content of at least 80-85% by making further use of the heat of the flue gas of the burning equipment 6 operated by us. We use a part of the solid pellet final product, favourably at least 30-50% of it as fuel in the burning equipment 6 operated by us. A further part of the solid pellet final product, advantageously 70-50%, is cooled in the cooler unit 7, then packaged in the packaging unit 8.

The solution according to the invention has numerous advantages. As a result of the high combustion temperature continuously maintained in the burning equipment 6 the burning of low calorific value fuel can be realised in a more perfect way, due to this there are lower emissions and a smaller amount of ash is created.

It can be said that on examination of the larger to smaller waster water treatment plants specific energy use becomes increasingly significant, an important feature of which is that in the smaller plants there are several fixed costs for a given cubic metre of wastewater sludge. The procedure and equipment developed by us plays a significant role in cutting these fixed costs. Smaller wastewater treatment plants can also make use of the equipment according to the invention due to its portability and mobility; therefore it is not necessary to transport the wastewater sludge without being treated. There are further energy-production possibilities involved in the utilisation of the surplus heat provided by our equipment (e.g. water heating, heating). Also, with the solution according to the invention it is possible to create fuel that is almost equivalent to brown coal. Following local processing the sale of the final pellet product may take place for use in the boilers and incineration plants of local settlement institutions. The pellets may also be usefully used in agriculture, favourably as fertiliser.

The subject of the invention relates to the production of solid fuel from wastewater sludge, during which the wastewater sludge containing 2-8% dry material is first subjected to mechanical water removal, during which the absorption water is removed and we produce wastewater sludge with a dry material content of at least 25-30%. The significant proportion of the remaining capillary water, favourably at least half of it, is removed by an accelerated evaporation process, drying. The essence of the procedure is that we pre-dry the wastewater sludge containing at least 25-30% dry material using the heat of the flue gas of the burning equipment operated by us to a dry material content of 50-55%, we extract the steam created and gases released during pre-drying, filtering them if necessary and utilise them by returning them to the burning equipment. We pelletize the wastewater sludge containing 50-55% dry material at a high pressure of, favourably, 800-900 bar, then we perform final drying of the pellet product created in this way to a dry material content of at least 80-85% by making further use of the heat of the flue gas of the burning equipment operated by us. We use a part of the solid pellet final product, favourably at least 30-50% of it as fuel in the burning equipment operated by us. A further subject of the invention relates to equipment for the production of solid fuel from wastewater sludge, which is connected to a mechanical dehydration unit (2) for the feeding of the wastewater sludge (1). The output of this is connected to a final dryer (5) through a pre-dryer (3) and pelletizer extruder (4). Furthermore it contains burning equipment (6) connected to the pre-dryer (3) and final dryer (5). The equipment is set up in such a way that the pre-dryer (3) is a double-walled drum, and there is a spiral-shaped mixing blade fixed inside this drum. The final dryer (5) is fitted with stainless steel bands, and the flue gas output (61) of the burning equipment (6) runs between the steel bands via a heat exchanger (62). The forced-flow air extraction (50) of the final dryer (5) is connected to the input (34) between the two walls of the double-walled drum of the pre-dryer (3), the suction connector (35) of the drum is connected with the combustion chamber of the burning equipment (6), favourably through a filter (64). Furthermore, the output (51) of the final dryer (5) at the end of the steel bands is connected to the burning equipment (6) through the fuel feeder (65).

The invention claimed is:

1. A process for producing solid fuel from wastewater sludge, comprising removing water from the wastewater sludge, which contains 2-8 wt % dry material by mechanical water removal to provide wastewater sludge with a dry material content of 25-30 wt %, drying the wastewater sludge containing 25-30 wt % dry material to a dry material content of 50-55 wt % by heat from a flue gas of a furnace, wherein steam and gases are released from the wastewater sludge, extracting the steam and gases, which are optionally filtered, and are fed to the furnace, pelletizing the wastewater sludge containing 50-55 wt % dry material at a pressure of 800-900 bar, which provides a pellet product, drying the pellet product to a dry material content of 80-85 wt % by heat of said flue gas of the furnace, which forms a solid pellet final product, wherein 30-50 wt % of the solid pellet final product is fed to the furnace as fuel.

2. A process according to claim 1, wherein the furnace has a combustion chamber to which air is fed, wherein the temperature of the air feeding the combustion chamber is maintained at around the temperature of the combustion chamber.

3. A process according to claim 1, wherein heat of a flue gas of the furnace produces energy.

4. A process according to claim 1, wherein 70-50 wt % of the solid pellet final product is cooled, then packaged.

5. A process according to claim 1, which is performed on equipment for the production of solid fuel from wastewater sludge, which equipment comprises a mechanical dehydration unit to which wastewater sludge is capable of being fed and which has an output that is connected to a final dryer through a pre-dryer and pelletizer extruder, the equipment further comprises a furnace that burns a part of said solid fuel product produced by the process, which is connected to the pre-dryer and final dryer, wherein the pre-dryer (3) is a double-walled drum (30), and there is a spiral-shaped mixing blade (31) fixed inside this drum (30), the final dryer (5) is fitted with stainless steel bands, and a flue gas output (61) of the furnace (6) runs between the steel bands via a heat exchanger (62), a forced-flow air extraction (50) of the final dryer (5) is connected to an input (34) between the two walls (32,33) of the double-walled drum (30) of the pre-dryer (3), a suction connector (35) of the drum (30) is connected with a combustion chamber (63) of the furnace (6), optionally through a filter (64), an output (51) of the final dryer (5) at the end of the steel bands is connected to the furnace (6) through a fuel feeder (65).

6. A process according to claim 5, wherein in the equipment the outside wall of the furnace (6) is fitted with heat insulation and a space(s) that raises the temperature of the gases feeding combustion is(are) formed in the wall and which is(are) connected to the combustion chamber (63) of the furnace (6).

7. A process according to claim 5, wherein the equipment contains a cooler unit (7) connected to the final dryer (5) and also includes a packaging unit (8).

8. A process according to claim 5, wherein the equipment is placed in a container(s).

9. A process according to claim 1, wherein the mechanical water removal is achieved by pressing, centrifuging, vacuum suction or filtering of the wastewater sludge.

10. A process according to claim 1, wherein the mechanical water removal is achieved by bringing the wastewater sludge into direct contact with materials the water transfer feature of which is much lower.

11. A process according to claim 1, wherein the mechanical water removal is achieved by pressing or squeezing the wastewater sludge between rollers.

12. A process according to claim 1, wherein the mechanical water removal is achieved by centrifuging the wastewater sludge.

13. A process according to claim 1, wherein the mechanical water removal is achieved by vacuum suction where pressure of flowing air removes water from the wastewater sludge.

14. A process according to claim 1, wherein the mechanical water removal is achieved by passing the wastewater sludge through a belt press.

15. The process of claim 1 wherein the only fuel used in the process is part of the solid pellet final product produced from the process.

* * * * *